United States Patent Office
2,920,031
Patented Jan. 5, 1960

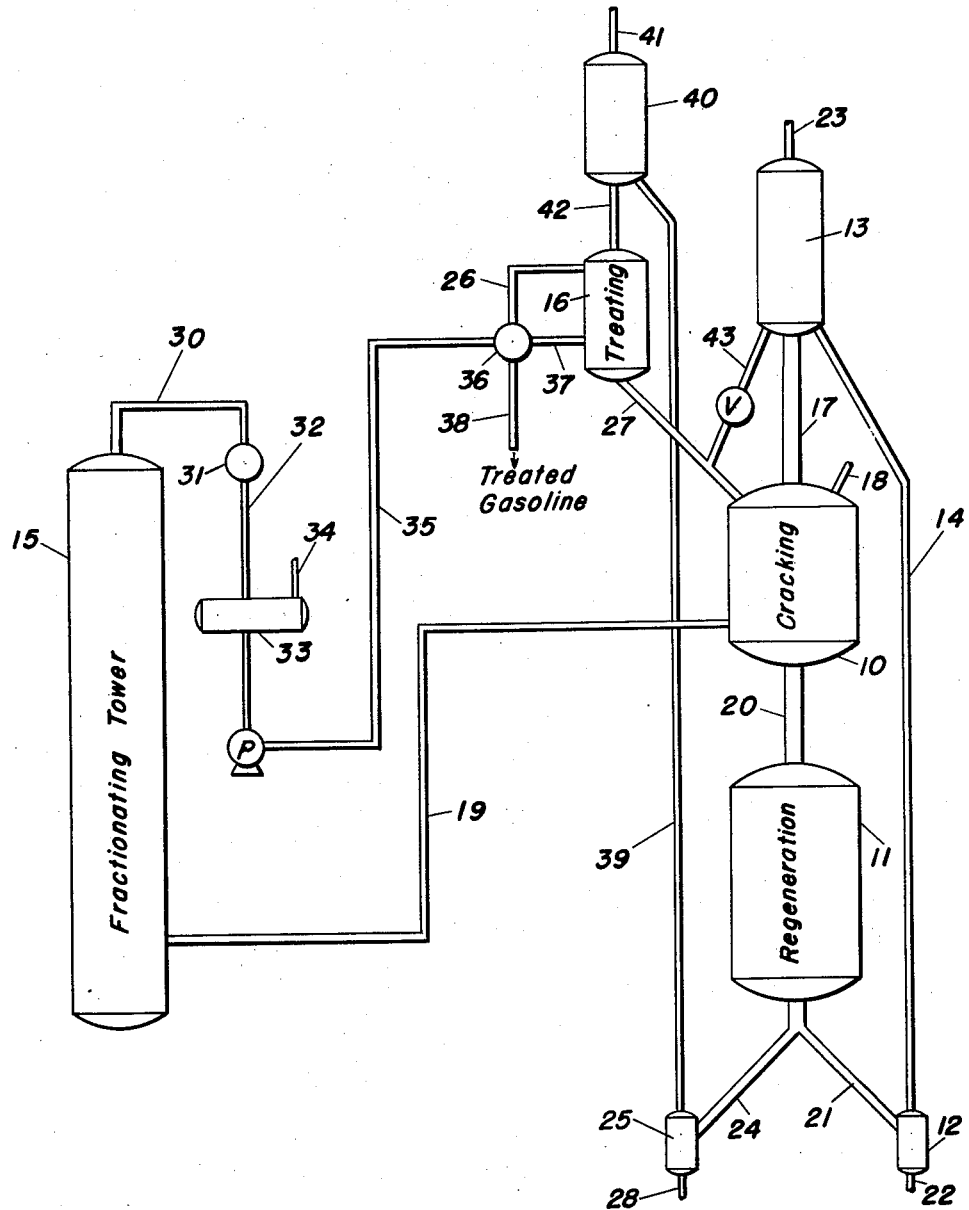

2,920,031

PRODUCING STABLE CRACKED GASOLINE BY CONTACTING A CRACKED GASOLINE FRACTION WITH A REGENERATED CRACKING CATALYST

Charles H. Brooks, Swarthmore, Pa., assignor to Sun Oil Company, Philadelphia, Pa., a corporation of New Jersey Application May 11, 1955, Serial No. 507,593

4 Claims. (Cl. 208—99)

This invention relates to producing stable cracked gasoline, and more particularly to a process for producing cracked gasoline having improved color, color stability, gum rating, etc.

Catalytically cracked gasoline as obtained from a synthetic crude fractionating tower frequently has unsatisfactory color, color stability, and gum rating, and it is frequently beneficial to contact the gasoline with a solid adsorbent material to improve these properties. However, it is often unsatifactory to effect such contact by treating the gasoline vapors from the synthetic tower prior to condensing, since this would necessitate a high pressure differential in the system in order to overcome the pressure drop through the adsorbent bed. On the other hand, it is often unsatisfactory to use external heat to revaporize the gasoline after it has been condensed, the cost of revaporizing being excessive. The treatment of the gasoline in the liquid state with solid adsorbents is often unsatisfactory because the reaction products tend to remain in the gasoline, thus giving it a poor color.

According to the present invention, these disadvantages are overcome by treating cracked gasoline with regenerated catalyst from the cracking operation, preferably using heat from the catalyst to vaporize the gasoline; catalyst from the gasoline treating operation is introduced directly, i.e. without regeneration, into the cracking operation.

The invention will be further described with reference to the attached drawing, which illustrates a catalytic cracking process for the production of gasoline from higher boiling petroleum materials.

In the drawing, a cracking reactor 10, catalyst regenerator 11, gas lift engaging vessels 12 and 25, gas lift disengaging vessels 13 and 40, lift conduits 14 and 39, fractionating or synthetic tower 15, and treating reactor 16 are shown. In operation, granular solid adsorbent cracking catalyst, e.g. synthetic silica-alumina catalyst or activated clay catalyst, is gravitated as a compact bed through line 17 into reactor 10. Hydrocarbon cracking charge, e.g. gas oil, is introduced into reactor 10 through line 18, and contacted under cracking conditions with the cracking catalyst, thereby to produce cracked products including gasoline, which products are withdrawn through line 19.

Cracking catalyst having carbonaceous materials deposited thereon is withdrawn from reactor 10 through line 20 and introduced into regenerator 11 wherein it is contacted with oxygen containing gas, introduced through means not shown, under oxidizing conditions in order to burn the carbonaceous deposits from the catalyst, the resulting flue gas being withdrawn through means not shown.

A portion of the regenerated catalyst is withdrawn from regenerator 11 through line 21 and introduced into engager 12. Lifting gas under pressure is introduced into engager 12 through line 22 and carries the regenerated catalyst through lift conduit 14 into disengager 13 wherein lifting gas is separated from catalyst and withdrawn through line 23. Regenerated catalyst from disengager 13 is withdrawn through line 17 as previously described.

Another portion of the regenerated catalyst from vessel 11 is withdrawn through line 24; this portion is substantially smaller than the portion removed through line 21, and is introduced into engager 25. Lifting gas under pressure is introduced into engager 25 through line 28 and carries the catalyst through lift conduit 39 into disengager 40 wherein lifting gas is separated from catalyst and withdrawn through line 41. Catalyst is withdrawn from disengager 40 through line 42 and introduced at a temperature of about 1100° F. into treater 16, through which it gravitates as a compact bed.

The cracked products withdrawn from reactor 10 through line 19 are introduced into synthetic crude fractionating tower 15 and subjected to fractionation therein. Overhead products including gasoline are removed as vapor through line 30, other fractions being removed through means not shown. The overhead products are passed through condenser 31 and line 32 into separator 33, from which uncondensed vapors are withdrawn through line 34, the condensed gasoline being pumped through line 35 into heat exchanger 36, wherein it is heated by indirect heat transfer with treated gasoline vapors obtained as subsequently described. The heating medium is withdrawn from heat exchanger 36 through line 38 and if necessary subjected to conventional condensation by means not shown. The heated gasoline, now at a temperature of about 350° F. and partially in vapor phase, is introduced through line 37 into treating vessel 16, wherein it is contacted with catalyst, which is at a temperature of about 500° F. at that level in the treater. The liquid gasoline in the charge is vaporized by contact with catalyst, and the vapors rise through the gravitating catalyst bed, being withdrawn at a temperature of about 450° F. through line 26 for subsequent passage through heat exchanger 36. During passage through the bed in treater 16, the gasoline is stabilized against color and gum formation by contact with the catalyst; substantially the only hydrocarbon reaction which takes place is polymerization; there is no substantial cracking.

Catalyst is withdrawn from treater 16 through line 27 at a temperature of about 500° F. A portion of regenerated catalyst having temperature of about 1100° F. is removed from disengager 13 through line 43 and commingled with the catalyst flowing through line 27. The flow rate of catalyst through line 43 is preferably less than the flow rate of catalyst through line 27, and preferably is sufficient to raise the temperature of the catalyst in line 27 to within the range from 100° F. to 200° F. above the endpoint of the gasoline treated. The amount to achieve this result is determinable by a person skilled in the art in the light of the present specification. It is not essential that catalyst from regenerator 13 be introduced into line 27, but such operation is preferred in order to vaporize some of the hydrocarbons remaining on the catalyst withdrawn from treater 16, whereby the vaporized hydrocarbons flow upwardly through line 27 into treater 16 and ultimately into line 26, thus eliminating unnecessary recycle of treated hydrocarbons to reactor 10. Such vaporization of hydrocarbons is generally sufficient to permit introduction, if desired, of a portion of the line 27 catalyst into regenerator 11 without danger of uncontrolled combustion. The point of introduction of catalyst from line 43 into line 27 should be a sufficient distance from reactor 10, determinable by a person skilled in the art, to provide an effective seal between this point and reactor 10.

Catalyst from lines 27 and 43 is introduced into reactor 10 where it becomes commingled with the catalyst introduced through line 17. The catalyst introduced through line 27 has hydrocarbon materials remaining thereon even after the contact with hot catalyst from line 43. These hydrocarbon materials comprise polymeric materials formed as a result of polymerization of olefinic constituents of the cracked gasoline. The hydrocarbon products withdrawn from reactor 10 through line 19 contain hydrocarbon materials that were introduced through line 27 with the catalyst, or products of conversion of such materials.

The introduction of catalyst from treater 16 into reactor 10 rather than regenerator 11 is advantageous in that it avoids the combustion and loss of recoverable hydrocarbon materials on the catalyst. Also it avoids the danger of uncontrolled combustion in the regenerator that would arise if catalyst from zone 16 were introduced, without removal of hydrocarbons therefrom, into regenerator 11. The presence of hydrocarbon materials on the catalyst introduced into reactor 10 through line 27 does not interfere to any unsatisfactory extent with the cracking activity of the catalyst.

According to the invention, cracked gasoline is contacted at a temperature within the approximate range from 250° F. to 650° F. with regenerated catalyst from the cracking process. Preferably the treated gasoline effluent temperature is less than 475° F. As illustrated in the drawing, a portion of the regenerated catalyts is contacted with the cracked gasoline, the rest being returned directly to the cracking step. Preferably the volume rate of passage of catalyst through treater 16 is within the approximate range from 1 to 20 percent, more preferably 2 to 11 percent, of the rate of passage of catalyst through line 17 into reactor 10. This percent varies directly with the difference between the regenerator catalyst outlet temperature and the reactor catalyst inlet temperature.

The countercurrent contacting operation in treater 16 as illustrated in the drawing is advantageous in that it provides contact of the hottest catalyst with vapors just prior to discharge of the latter, whereas in concurrent operation, such vapors are contacted with the least hot catalyst; the countercurrent operation generally permits the use of lesser amounts of catalyst to attain a given extent of stabilization.

It is not essential that the gasoline be vaporized after introduction into treater 16. Instead, the gasoline may be passed upwardly in liquid phase through the catalyst bed and withdrawn in liquid phase through line 26. In such operation, the fresh catalyst in the upper portion of treater 16 removes gum-forming and color body constituents of the liquid gasoline that are formed in the lower portion of treater 16 upon contact of the liquid gasoline with catalyst.

It is not essential that the gasoline be condensed prior to introduction into treater 16. Instead, the lower-boiling constituents, including gasoline, of the vaporous products withdrawn from reactor 10 through line 19 can, after removal of higher-boiling constituents by condensation, be introduced as vapor into a lower portion of treater 16 and passed upwardly therethrough. However, such operation is not preferred, since it would require the pressure of the vaporous products withdrawn through line 19 to be sufficiently high to overcome the pressure drop on passage through treater 16, with the result that the pressures in the catalyst circulation system would have to be higher. Furthermore, use of the heat in the regenerated catalyst to revaporize the gasoline is advantageous in that it aids in reducing the temperature of the catalyst to the desired treating temperature.

In one embodiment of the invention, the liquid gasoline in line 35 can be completely revaporized, in a pipe still for example, prior to introduction into treater 16. Such operation is not preferred, however, it being generally more advantageous to use the regenerated catalyst to provide at least part of the heat for the revaporization.

In the process illustrated in the drawing, all of the catalyst removed from treating zone 16 was introduced into cracking zone 10, and such operation is preferred according to the invention. If desired, a portion of the catalyst removed from treating zone 16 can, after hydrocarbon removal therefrom, be introduced into regenerator 11, or can otherwise be disposed of, but such operation is not preferred, and in any event at least 50 weight percent of the catalyst removed from treating zone 16 is introduced into cracking zone 10.

The use of the heat exchanger 36 is not essential according to the invention, but is preferred in order to provide flexibility in the possible ratios of catalyst to gasoline in treater 16, the thermal requirements of the catalyst contact being lower when the heat exchanger is used, thus permitting a lower regenerator catalyst outlet temperature.

The separate lifting apparatus including lift conduit 39 is not essential according to the invention, since the treater 16 could be positioned below disengager 13 and could receive a portion of the regenerated catalyst therefrom by gravitation. The separate lifting apparatus is preferred, however, in order to simplify the control of the amount of catalyst flowing to treater 16.

The invention can be employed in cracking processes generally, the temperatures, catalyst-to-oil ratios, manner of contact of solids and oil, etc. being capable of selection for a particular case by a person skilled in the art.

The cracked gasoline which is stabilized according to the invention may be a full range cracked gasoline having a typical initial boiling point and endpoint for such gasoline, e.g. about 125° F. and 425° F. respectively, or it may be a portion of such gasoline, e.g. the portion boiling above about 350° F., or a lower boiling portion, etc.

The invention claimed is:

1. Process for producing a stable cracked gasoline which comprises: contacting a petroleum charge stock with solid adsorbent cracking catalyst under cracking conditions in a cracking zone, thereby to produce cracked products; regenerating the cracking catalyst by burning carbonaceous deposits therefrom; dividing the regenerated catalyst into a first portion and a second portion; returning the second portion to the cracking zone; redividing the first portion into a first subportion and a second subportion; separating a gasoline fraction from higher boiling cracked products produced in the cracking zone; contacting said gasoline fraction in liquid phase with the first subportion of the regenerated catalyst in a refining zone at a temperature within the approximate range from 250° F. to 650° F.; thereby to vaporize a predominant portion of the liquid gasoline, a small proportion of the liquid gasoline remaining on the catalyst; removing the evolved vapor from the refining zone; passing catalyst from the refining zone downwardly through a conduit; commingling the latter catalyst with the second subportion of regenerated catalyst, thereby to vaporize liquid remaining on the first subportion of regenerated catalyst; passing the evolved vapor upwardly through said conduit; subsequently separating the latter evolved vapor from catalyst; and introducing at least 50% by weight of the first subportion into the cracking zone to contact additional petroleum charge stock under cracking conditions.

2. Process according to claim 1 wherein said gasoline fraction is passed upwardly in the refining zone through a gravitating compact bed of the first subportion of the regenerated catalyst.

3. Process according to claim 1 wherein said catalyst is a synthetic silica-alumina catalyst.

4. Process according to claim 1 wherein a portion of the first subportion of catalyst is regenerated, after removal from the refining zone by burning carbonaceous deposits therefrom prior to contacting with additional petroleum charge stock under cracking conditions.

References Cited in the file of this patent

UNITED STATES PATENTS

| | | |
|---|---|---|
| 2,091,892 | Stratford | Aug. 31, 1937 |
| 2,305,742 | Simpson et al. | Dec. 22, 1942 |
| 2,357,136 | Rubin | Aug. 29, 1944 |
| 2,416,217 | Reeves et al. | Feb. 18, 1947 |
| 2,549,518 | Perry | Apr. 17, 1951 |
| 2,632,720 | Perry | Mar. 24, 1953 |
| 2,666,732 | McConnell | Jan. 19, 1954 |
| 2,666,733 | Scovill | Jan. 19, 1954 |
| 2,692,223 | Lupfer | Oct. 19, 1954 |
| 2,701,786 | Evans et al. | Feb. 8, 1955 |
| 2,758,059 | Berg | Aug. 7, 1956 |